(12) United States Patent
Foucault et al.

(10) Patent No.: US 11,099,120 B2
(45) Date of Patent: Aug. 24, 2021

(54) ANALYSIS CUVETTE AND DERIVATIVES WITH SIGNAL AMPLIFICATION

(71) Applicant: BIOMERIEUX, Marcy l'Etoile (FR)

(72) Inventors: Frédéric Foucault, Marcy l'Etoile (FR); Cécile Vinit, Les Olmes (FR)

(73) Assignee: BIOMERIEUX, Marcy l'Etoile (FR)

( * ) Notice: Subject to any disclaimer, the term of this patent is extended or adjusted under 35 U.S.C. 154(b) by 113 days.

(21) Appl. No.: 15/781,453

(22) PCT Filed: Dec. 16, 2016

(86) PCT No.: PCT/FR2016/053507
§ 371 (c)(1),
(2) Date: Jun. 4, 2018

(87) PCT Pub. No.: WO2017/103522
PCT Pub. Date: Jun. 22, 2017

(65) Prior Publication Data
US 2019/0302005 A1   Oct. 3, 2019

(30) Foreign Application Priority Data

Dec. 18, 2015   (FR) ...................................... 1562721

(51) Int. Cl.
*G01N 21/03*   (2006.01)
*G01N 21/64*   (2006.01)

(52) U.S. Cl.
CPC ....... *G01N 21/0303* (2013.01); *G01N 21/031* (2013.01); *G01N 2021/0314* (2013.01); *G01N 2021/0378* (2013.01); *G01N 2021/0382* (2013.01); *G01N 2021/6482* (2013.01)

(58) Field of Classification Search
CPC ............. G01N 21/0303; G01N 21/031; G01N 2021/0357; B01L 3/502; B01L 3/5082; B01L 9/06
See application file for complete search history.

(56) References Cited

U.S. PATENT DOCUMENTS

| 4,453,639 | A | * | 6/1984 | Sharma | ..................... | B01L 9/06 |
| | | | | | | 211/74 |
| 5,973,330 | A | * | 10/1999 | Hayashi | ............... | G01N 21/645 |
| | | | | | | 250/353 |
| 8,605,279 | B2 | * | 12/2013 | Gotschy | ............. | G01N 21/0303 |
| | | | | | | 356/246 |

(Continued)

FOREIGN PATENT DOCUMENTS

| FR | 3000218 A1 | 6/2014 |
| WO | 97/19339 A1 | 5/1997 |

OTHER PUBLICATIONS

Mar. 21, 2017 International Search Report issued on International Patent Application No. PCT/FR2016/053507.

(Continued)

*Primary Examiner* — Maurice C Smith
(74) *Attorney, Agent, or Firm* — Oliff PLC

(57) ABSTRACT

A cuvette in which a fluorescent enzymatic reaction can be carried out that is for analyzing a sample includes at least one vertical wall and a bottom. The cuvette is made of a transparent or translucent material and a portion of the cuvette is partially covered on the outside with a sleeve including an inner coating made of retro-reflective material that is in contact with the cuvette.

21 Claims, 6 Drawing Sheets

(56) References Cited

U.S. PATENT DOCUMENTS

| | | | |
|---|---|---|---|
| 2002/0086431 A1* | 7/2002 | Markham | G01N 1/2813 |
| | | | 436/63 |
| 2004/0022677 A1* | 2/2004 | Wohlstadter | G01N 21/69 |
| | | | 422/52 |
| 2004/0047770 A1* | 3/2004 | Schawaller | G01N 21/648 |
| | | | 422/400 |
| 2008/0151249 A1* | 6/2008 | Walker | G01N 21/0303 |
| | | | 356/445 |
| 2011/0093207 A1 | 4/2011 | Ingber et al. | |
| 2013/0077167 A1* | 3/2013 | Kim | G02B 5/12 |
| | | | 359/536 |

OTHER PUBLICATIONS

Mar. 21, 2017 Written Opinion of the International Searching Authority issued in International Patent Application No. PCT/FR2016/053507.

* cited by examiner

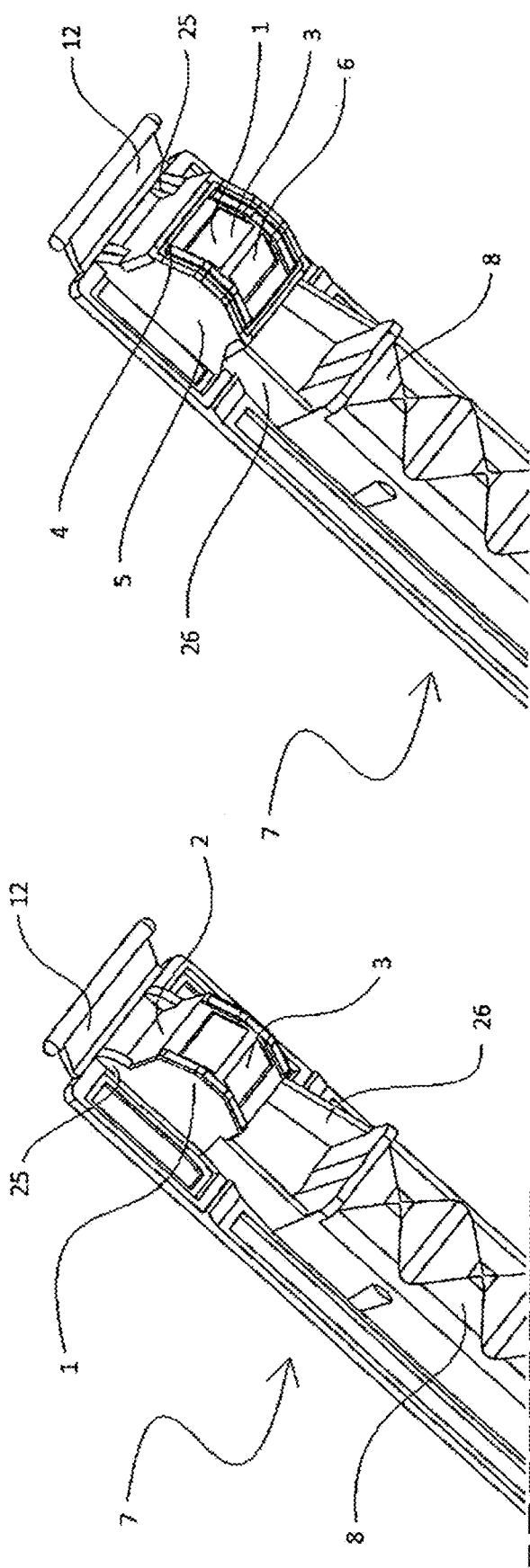

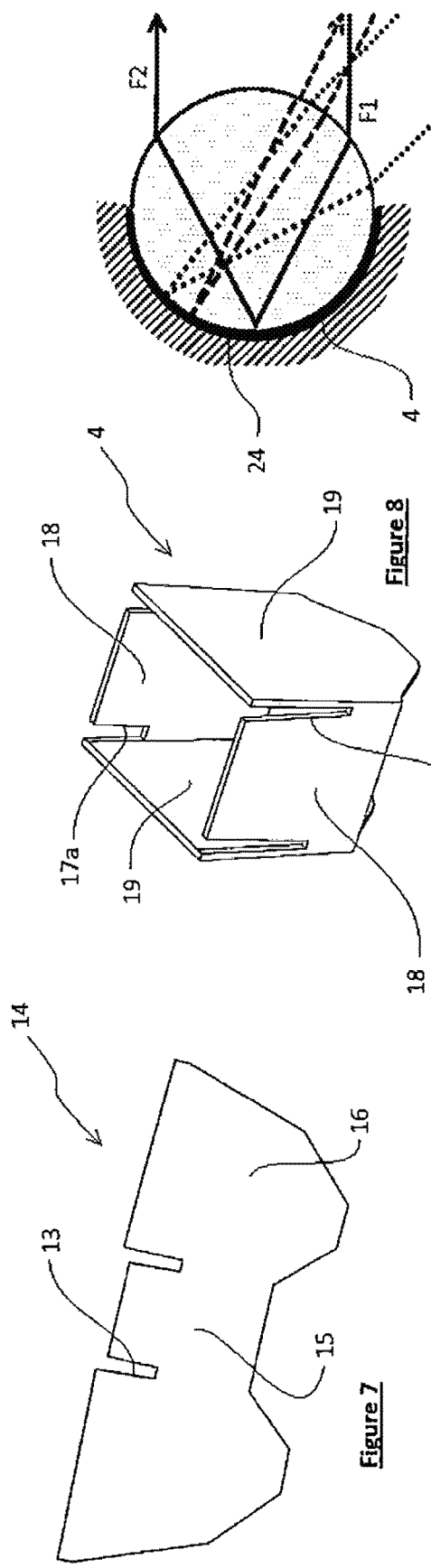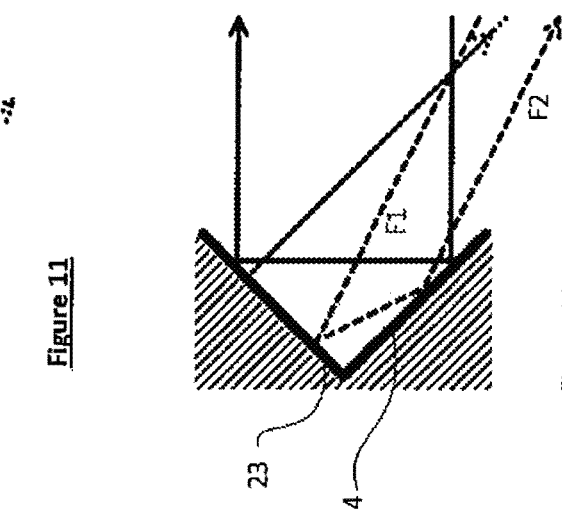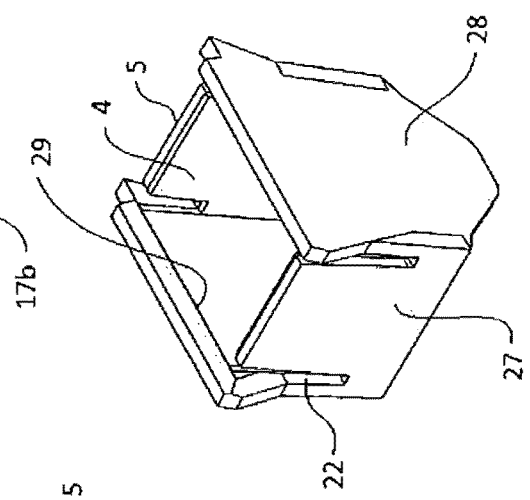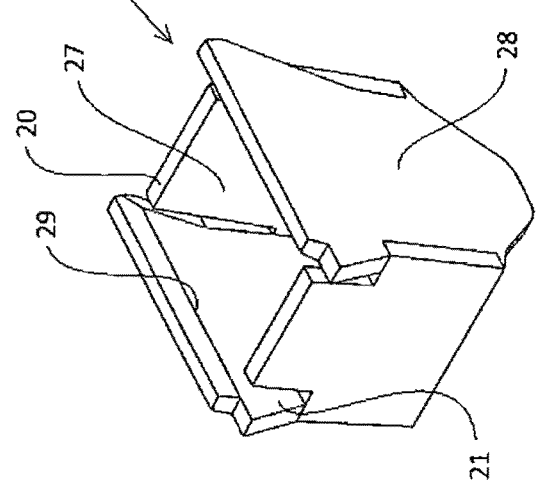

ANALYSIS CUVETTE AND DERIVATIVES WITH SIGNAL AMPLIFICATION

The present invention relates, in general, to the field of the analysis of test samples and more particularly an analysis bar. This bar is optionally combined with a receptacle containing a tip suitable for use with the analysis bar for a specific sample analysis. In this respect, the reader is referred to patent application FR-A-1 262 786 filed by the Applicant for further information on this subject.

In the field of the analysis of samples that may contain analytes of interest, it is known practice to use methods based on specific measurements such as signal measurements. The analysis of the test sample must therefore comprise the use of a reagent, representative of the analyte to be detected or to be quantified in the sample. The reagent makes it possible to obtain a reaction product. The medium resulting from the test sample and containing the reaction product is then a reaction medium. Thus, the specific measurements may comprise, for example, fluorimetric measurements, that is to say measurements which make it possible to quantify fluorescent signals emitted during the biological analysis of the sample. In this situation, the reaction product obtained has fluorescence properties. By application of the principle of fluorescence, such a reaction product exposed to a light source, corresponding to a first wavelength termed excitation wavelength, in turn emits light rays according to a second wavelength termed emission wavelength. The detection of the fluorescent signals, in this reaction medium, associated with processing of the signal from these fluorescent signals, makes it possible to determine, for example, the presence or the concentration of the specific analyte sought in the test sample. Of course, other types of sample analyses using an analysis bar and a receptacle containing a suitable tip can be envisioned.

Sample analyses can be carried out using an analysis device into which is introduced an analysis bar comprising at least two cuvettes, each filled with a particular liquid. The analysis bar comprises, in general, a cuvette suitable for receiving a test sample.

During the analysis of this sample, a tip or a pipette is used to suction an amount of said sample and to deposit said sample inside the various cuvettes present in the analysis bar. The liquids present inside the various cuvettes can react with the test sample to obtain, at the end of a liquid transfer cycle, for example from one cuvette to another, a liquid, or reaction medium, on which the measurements of a signal can be performed.

In order to ensure that such an analysis, for which an analysis bar is used in combination with a tip, proceeds optimally, it is important to combine, on the one hand, an analysis bar and, on the other hand, a tip suitable for this analysis bar. The suitable tip comes, for example, from the same batch as that of the analysis bar. Since the tip and the bar are produced separately and have different expiration dates, it is therefore advisable to be sure that a batch actually contains a tip and an analysis bar for the same target/parameter and the expiration date of which has not expired.

The suitable tip can also contain a part of the reagents required for the emission of the signal, the analysis bar containing the other part of the reagents. Thus, this correct combination guarantees that the analysis device, using the assembly comprising the analysis bar and the tip, will provide an analysis result associated with this combination. Indeed, when the assembly composed of an analysis bar and a tip is used, the user may mistakenly handle an analysis bar in combination with a tip which is not intended to be used with said analysis bar. This error may cause erroneous results regarding the analysis carried out, such as false-negative results.

One of the most important problems with these tests using fluorimetric measurements lies in the level and the quality (low background noise) of the fluorescent signals emitted. If they are too weak because the number of associated biological reactions is not sufficiently high, there is a risk that the user or the apparatus, if it is an automated system, will readily categorize the result of the test as being negative, although it is in fact positive. This is what is referred to as a false negative.

This situation is the one that:
the kit manufacturer,
the apparatus manufacturer,
the user or the practitioner,
the patient,
dread the most since, in this case, the patient and all of the abovementioned professionals working in the field will think that the patient is in good health with regard to the parameter studied, whereas this is incorrect.

The present invention proposes to very significantly limit the number of false negatives by proposing a technique which easily amplifies the emission fluorescence.

To this effect, the present invention relates to a cuvette for analyzing a biological sample, made of a transparent or translucent material, said cuvette consisting of at least one vertical wall and of a bottom partitioning the cuvette, in which a fluorescent enzymatic reaction can be carried out, which is characterized in that a portion of the cuvette is partially covered on the outside with a sleeve of which the inner coating in contact with said cuvette is made of retro-reflective material.

According to one embodiment of the cuvette and of the sleeve, the interior shape of said sleeve partially matches the exterior shape of the cuvette, with the exception of at least one zone allowing, on the one hand, the illumination at an excitation wavelength and, on the other hand, the detection of the emission wavelength from the outside of said cuvette.

According to another embodiment of the cuvette and of the sleeve, the retro-reflective material either comprises prisms or comprises beads.

According to one embodiment of the cuvette and of the sleeve, the sleeve is attached to the cuvette by adhesive bonding without deterioration of the optical qualities of the interior face of said sleeve.

According to this embodiment, the adhesive is transparent or translucent and does not absorb UV rays.

According to yet another embodiment of the cuvette and of the sleeve, the sleeve is attached to the cuvette by mechanical clip-fastening.

Still according to another embodiment of the cuvette and of the sleeve, the inner coating made of retro-reflective material is not secured to the cuvette, but is sandwiched between said cuvette and the sleeve, forming clips.

According to one variant of all these embodiments, the sleeve is totally or partially present at the level of the lateral partition(s) of the cuvette and it is absent at the bottom of the cuvette.

The present invention also relates to an analysis bar for carrying out an analysis of a sample, the analysis bar comprising a plurality of cuvettes suitable for containing and storing a liquid and for being used in combination with a tip during the analysis, the tip being capable of suctioning an amount of liquid from a first cuvette and expelling all or part of this amount of liquid into a second cuvette, said analysis bar comprising a cuvette as described above.

According to one embodiment of the bar, the plurality of the cuvettes are positioned along a longitudinal axis and the first cuvette is suitable for receiving the sample and the final cuvette is suitable for allowing the reading of a signal emitted by the reaction medium, resulting from the sample, during the analysis and corresponds to the cuvette as previously described.

The invention also relates to a use of an analysis cuvette, previously described, or of an analysis bar, set out above, for analyzing a sample.

According to one particular embodiment of use of a cuvette or of an analysis bar, previously described, wherein the analysis is carried out by immunological assay.

In one particular embodiment of use of a cuvette or of an analysis bar, in which:
- an enzymatic reaction between a substrate and an enzyme is carried out,
- this reaction resulting in a degradation product in the form of a fluorescent molecule,
- the fluorescent molecule being subjected to illumination at an excitation wavelength which in return results in fluorescence at an emission wavelength, which is specific for at least one analyte present in the biological sample.

Finally, the invention relates to an analysis device for a cuvette or an analysis bar, as previously described, said analysis device containing a support for said cuvette or bar and a guiding mechanism in order to impose the movement of the cuvette or bar from a first position to a second position.

The figures attached hereto are given by way of explanatory example and are in no way limiting in nature. They will make it possible to understand the invention more clearly.

FIG. 3 represents a perspective view from below the reading cuvette before the retro-reflective paper and the clip have been put in place.

FIG. 4 represents a perspective view from below the reading cuvette after the retro-reflective paper and the clip have been put in place.

FIG. 7 represents a sheet of retro-reflective paper according to the invention according to a three-face embodiment and before forming.

FIG. 8 represents a sheet of retro-reflective paper according to the invention according to a four-face embodiment but after forming.

FIG. 9 represents a perspective view of an embodiment of the sleeve or clip before the sheet of retro-reflective paper has been put in place therein.

FIG. 10 represents a perspective view of an embodiment of the sleeve or clip according to FIG. 9 after the sheet of retro-reflective paper has been put in place therein according to FIG. 4.

FIG. 11 shows a sectional view of a retro-reflective system based on glass microbeads, several light rays entering in a first direction F1, termed excitation wavelength, which, after reflection on the interior wall of the semi-circular inner coating of the spherical volume, are reflected in the form of light rays exiting in a direction F2, termed emission wavelength. The directions F1 and F2 are parallel.

FIG. 12 represents a figure identical to FIG. 11, the only difference being that the interior wall of the inner coating is polyhedral in shape, with at least two faces perpendicular to one another.

Figure 13:
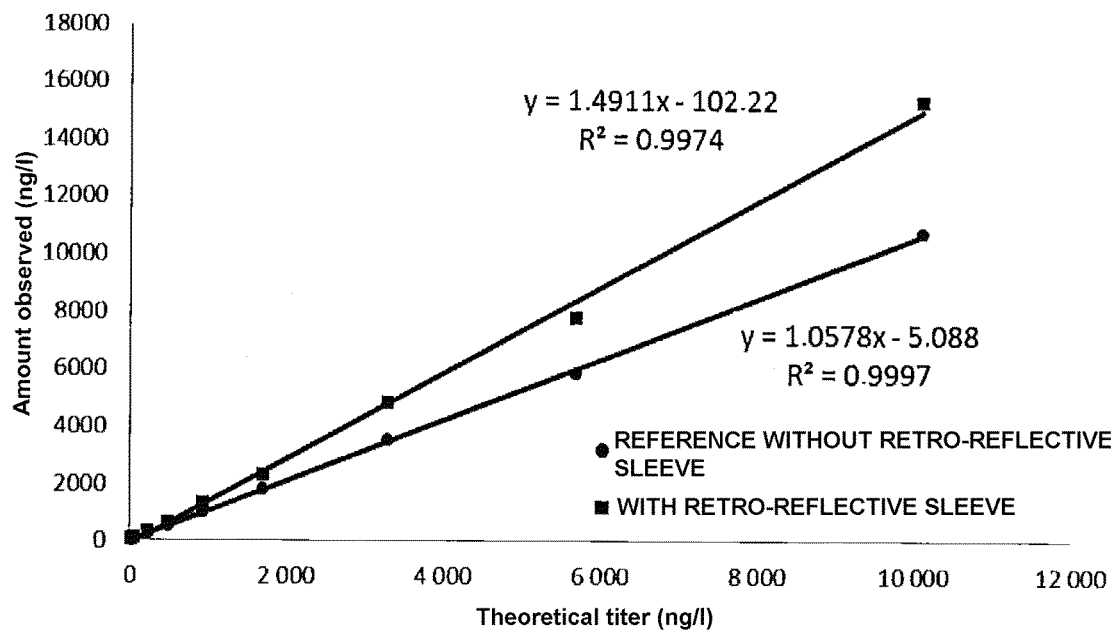

FIG. 13 represents a graph showing the determination of the amount observed with or without the sleeve according to the invention in a VIDAS® TNI Ultra kit.

Figure 14:
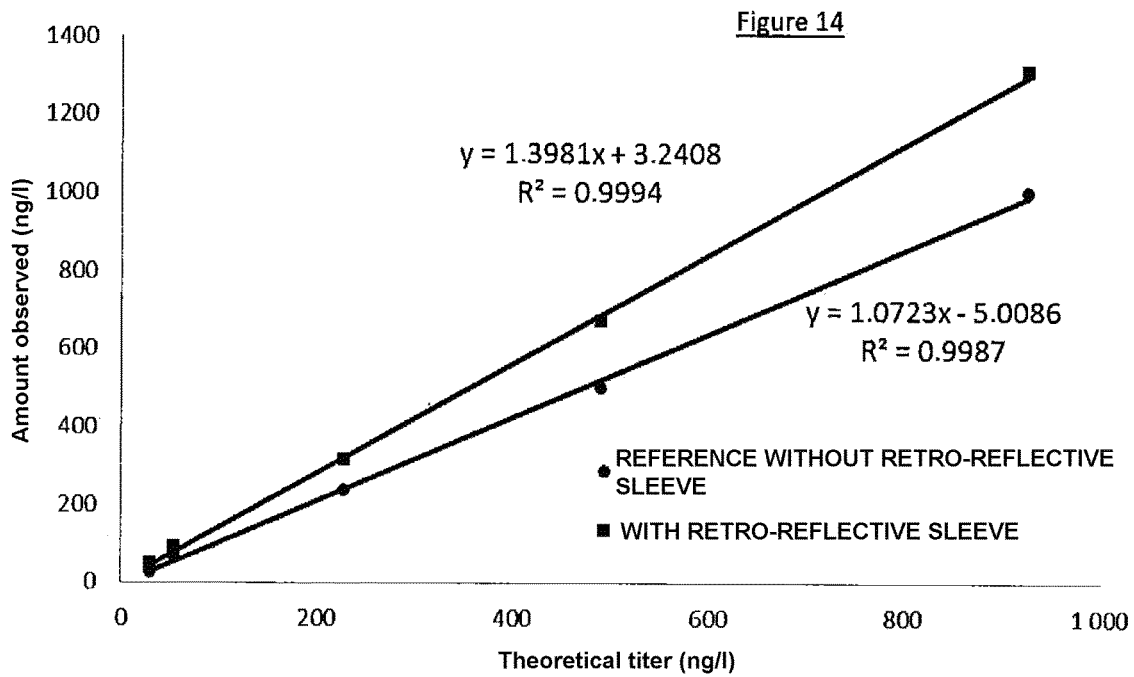

FIG. 14 is similar to the graph of FIG. 13 that shows the determination of the amount observed with or without the invention in a VIDAS® TNI Ultra kit, but zooming on the zone of concentration of between 0 and 1000 ng/l.

Figure 15:
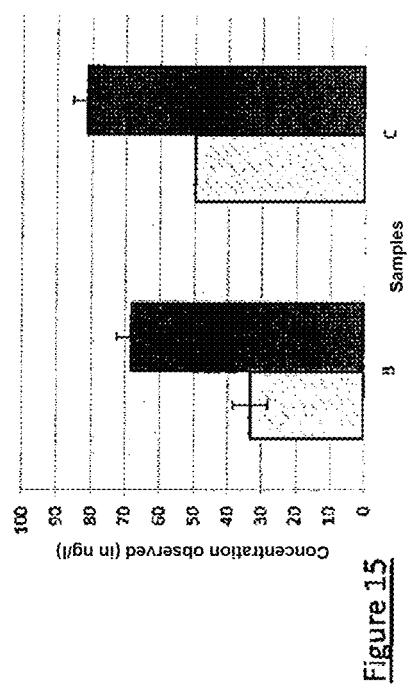

Finally, FIG. 15 is a graphic representation of the study of repeatability of the samples B and C assayed with the VIDAS® TNI Ultra kit with or without the presence of the sleeve according to the invention. The two light columns represent the sample B or C assayed without the presence of said sleeve. The two dark columns represent the sample B or C assayed in the presence of said sleeve.

The objective of the detailed description below is to set out the invention sufficiently clearly and completely, in particular by means of examples, but should not in any way be regarded as limiting the scope of protection to the particular embodiments and to the examples presented below. The examples below will make it possible to understand the present invention more clearly. However, these examples are given only by way of illustration and should not in any way be regarded as limiting the scope of said invention in any way.

The present invention is characterized in that a portion of the cuvette is partially covered on the outside with a sleeve of which the inner coating in contact with said sleeve is made of retro-reflective material.

A retro-reflective material is understood to mean any material which has the property of reflecting light to the source. In other words, when an excitation photon hits the retro-reflective material, this photon is reflected to the axis of reading.

The present invention relates to the analysis, such as the biological analysis, of samples. According to the present invention, the sample may be of various origins, for example of food, environmental, veterinary, clinical, pharmaceutical or cosmetic origin.

Among the samples of food origin, mention may be made, non-exhaustively, of a milk product (yogurts, cheeses, etc.), meat, fish, egg, fruit, vegetable, water, beverage (milk, fruit juice, soda, etc.) sample. Of course, these samples of food origin may also come from more elaborate sauces or dishes or from non-transformed or partially transformed raw materials. A food sample may also come from an animal feed, such as oilcakes, animal meals.

As indicated previously, the sample may be of environmental origin and may consist, for example, of a sample taken from a surface, from water, etc.

The sample may also consist of a biological sample, of clinical, human or animal origin, which may correspond to samples taken from biological fluid (urine, whole blood or derivatives such as serum or plasma, saliva, puss, cerebrospinal fluid, etc.), from stools (for example choleric diarrhea), samples taken from the nose, throat, skin, wounds, organs, tissues or isolated cells. This list is obviously not exhaustive.

In general, the term "sample" refers to a portion or to an amount, more particularly a small portion or a small amount, taken from one or more entities for the purposes of analysis. This sample may optionally have undergone a prior treatment, including for example mixing, diluting or else milling steps, in particular if the starting entity is in the solid state.

The sample analyzed is capable of—or is suspected of—containing at least one analyte representative of the presence of microorganisms or of a disease to be detected, characterized or monitored.

The sample analysis may carry out a reaction between the analyte of interest and one or more binding partner(s) specific to the analyte.

According to one embodiment of the present invention, the reaction is an immunological reaction and the analyte to be determined is a protein, a peptide or a hapten. This reaction involves, as binding partner(s), antigens and/or antibodies, receptors for the analyte. By way of examples of immunological reactions, mention may be made of "competing" reactions and "sandwich" reactions carried out in ELISA-type or ELFA-type assays.

Of course, the term "immuno" in "immunoassay" is not to be considered in the present application as strictly indicating that the binding partner is an immunological partner, such as an antibody. Indeed, those skilled in the art also widely use this term when the binding partner, also called ligand, is not an immunological partner, but is, for example, a receptor for the analyte that it is desired to assay. Thus, it is known practice to refer to the ELISA (Enzyme-Linked Immunosorbent Assay) for assays which use non-immunological binding partners, more widely termed "Ligand Binding Assay", although the same term "immuno" is included in the acronym ELISA. In the interest of clarity, the Applicant will, in the application, use the term "immuno" for any assay of a protein analyte using a binding partner, even when it is not an immunological partner.

The reaction may also be a hybridization reaction and the analyte to be determined is a nucleic acid of DNA or RNA type, namely a reaction which involves a nucleotide fragment complementary to the analyte to be determined.

Figure 1:
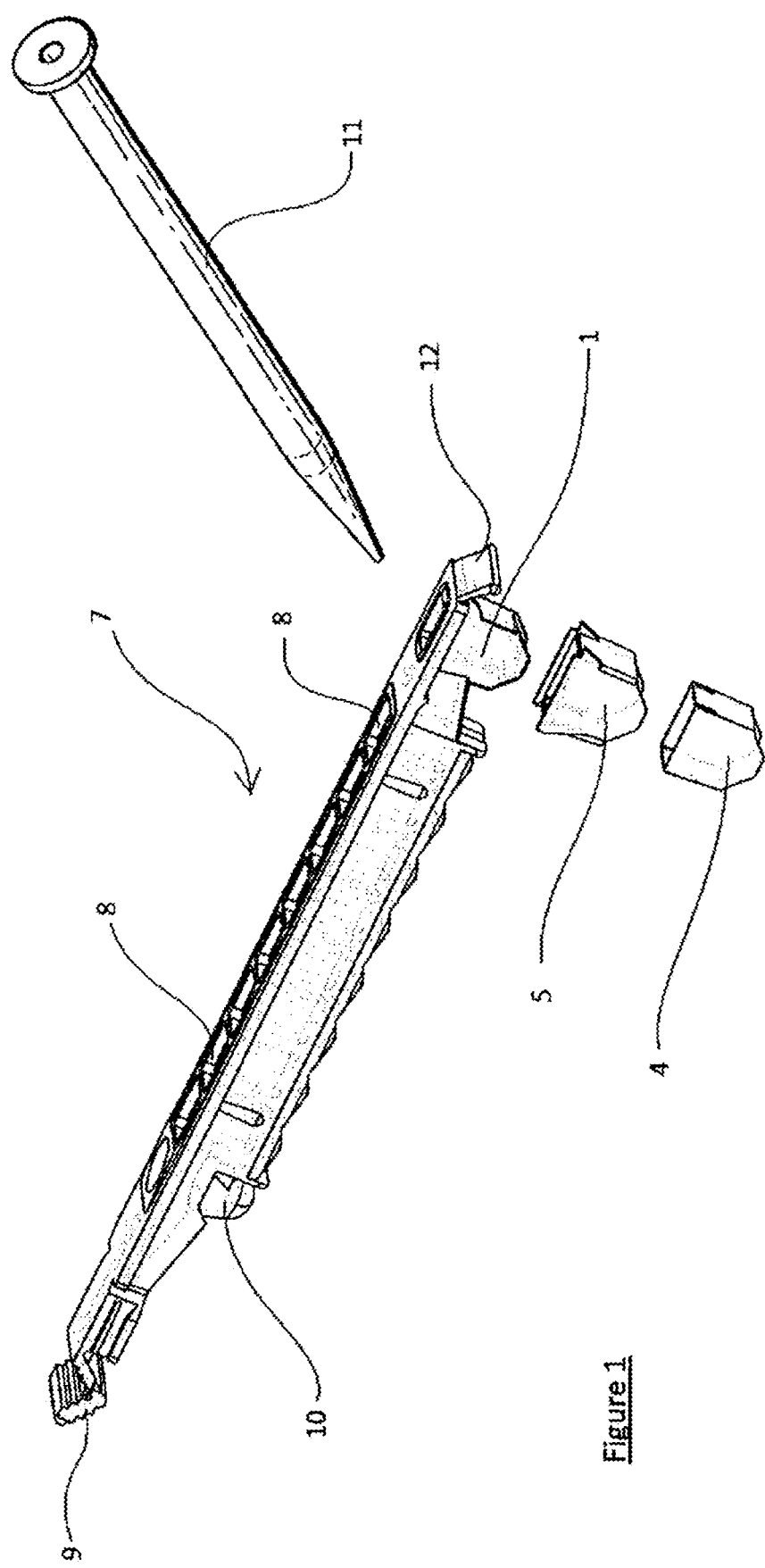
FIG. 1 represents a perspective view before the fitting of the retro-reflective paper on the clip and the reading cuvette of the bar, in the presence of a detection tip.

FIG. 1 shows an analysis bar 7 according to the prior art and a tip 11, suitable for use with the analysis bar 7. The analysis bar 7 comprises a support 9 suitable for manipulating the analysis bar 7. The analysis bar 7 comprises a first cuvette 10, and a plurality of cuvettes 8, that is to say at least two cuvettes 8. The analysis bar 7 also comprises a final cuvette 1. Each cuvette 8 is suitable for receiving and conditioning liquids or fluids used during a biological analysis of samples. A protective film (not shown) located on the upper edges of the cuvettes makes it possible to cover in a leaktight manner the various contents of the various cuvettes 1, 8 and 10. The protective film may be pierced with the tip 11 during the use of the analysis bar 7, or else the film covering the cuvette 10 may or may not be pre-pierced for receiving the sample. The first cuvette 10, for example of cylindrical shape, is suitable for receiving a sample to be analyzed.

The cuvettes 8 containing liquids are closed on all their faces and comprise reagents required for the reaction for determining the presence of the test analyte or for quantifying the analyte. In particular, one of the cuvettes 8 comprises a reagent which, depending on the analysis conditions, for example in the presence of the analyte to be detected or quantified, is capable of generating a reaction product which emits a signal if the analyte is present in said sample. The analysis of the sample is based on this reaction product. The reaction product is the result of the movement of at least one part of the sample from the first cuvette 10, via the cuvettes 8, to the final cuvette 1.

During a sample analysis, the transporting of liquid between the various cuvettes 1, 8 and 10 is carried out by means of the tip 11 shown in FIG. 1. The tip 11 is used as solid phase in the reaction since the inside of the tip is covered with at least one partner for binding to the analyte. The tip 11 makes it possible to suction liquid from the first cuvette 10 in order to expel the suctioned liquid into a cuvette 8 so as to obtain a first mixture. The tip 11 then suctions this first mixture and expels the first mixture into another cuvette 8 so as to obtain a second mixture and so on until the final cuvette 1 into which the reaction medium is expelled. According to the type of analysis desired, all or some cuvettes 8 may be required for the analysis of the reaction medium resulting from the sample initially taken from the cuvette 10.

As shown in FIG. 1, the analysis bar 7 comprises a final cuvette 1 located at the second end of the analysis bar 7.

The final cuvette 1 comprises vertical walls which have a thickness of about 1 millimeter. The vertical walls are joined together by a base comprising two inclined and butt-joined walls.

The analysis of the sample is carried out using simultaneous steps of illuminating and of detecting the signal emitted by the content of this final cuvette 1.

In order to optimize the proceeding of an analysis of a sample and the reliability of the results obtained by analyzing the content of the final cuvette 1, it is important, through the analyses, for an analysis bar 7 to be correctly paired with the tip used for the transfer of the various fluids in the various cuvettes of the analysis bar 7.

When an analysis bar 7 and a tip 11 are manually introduced into a sample analysis device (not shown), the operator must pay attention and use the correct combination of an analysis bar and a tip. If the analysis device comprises several bar supports, such as rails, the operator must carefully perform a number of manipulations equal to the number of rails for each test. These various manipulations consist, before the test, in inserting the analysis bar and in inserting the corresponding tip, and, after the test has been carried out, in removing the analysis bar and in removing the tip.

In order to assist the operator or the automated analysis device, and in order to guarantee correct pairing of an analysis bar and a tip, the analysis bar and the tip can be fitted with an identifier which makes it possible to identify the type of the analysis bar and of the tip that are used, their expiration date, their batch number, etc.

The description which follows relates to an analysis bar, an analysis device and a use of the analysis bar according to the present invention.

In the description which follows, the reference to a cuvette comprises, for example, any cuvette comprising a continuous, oblong-shaped wall or any cuvette comprising vertical walls joined by a base comprising, for example, two inclined and butt-joined walls.

In the description which follows, the reference to the protective film comprises any type of film, for example two-layer or three-layer, made for example of polyethylene terephthalate (PET)/aluminum/polyethylene (PE).

Figure 2:
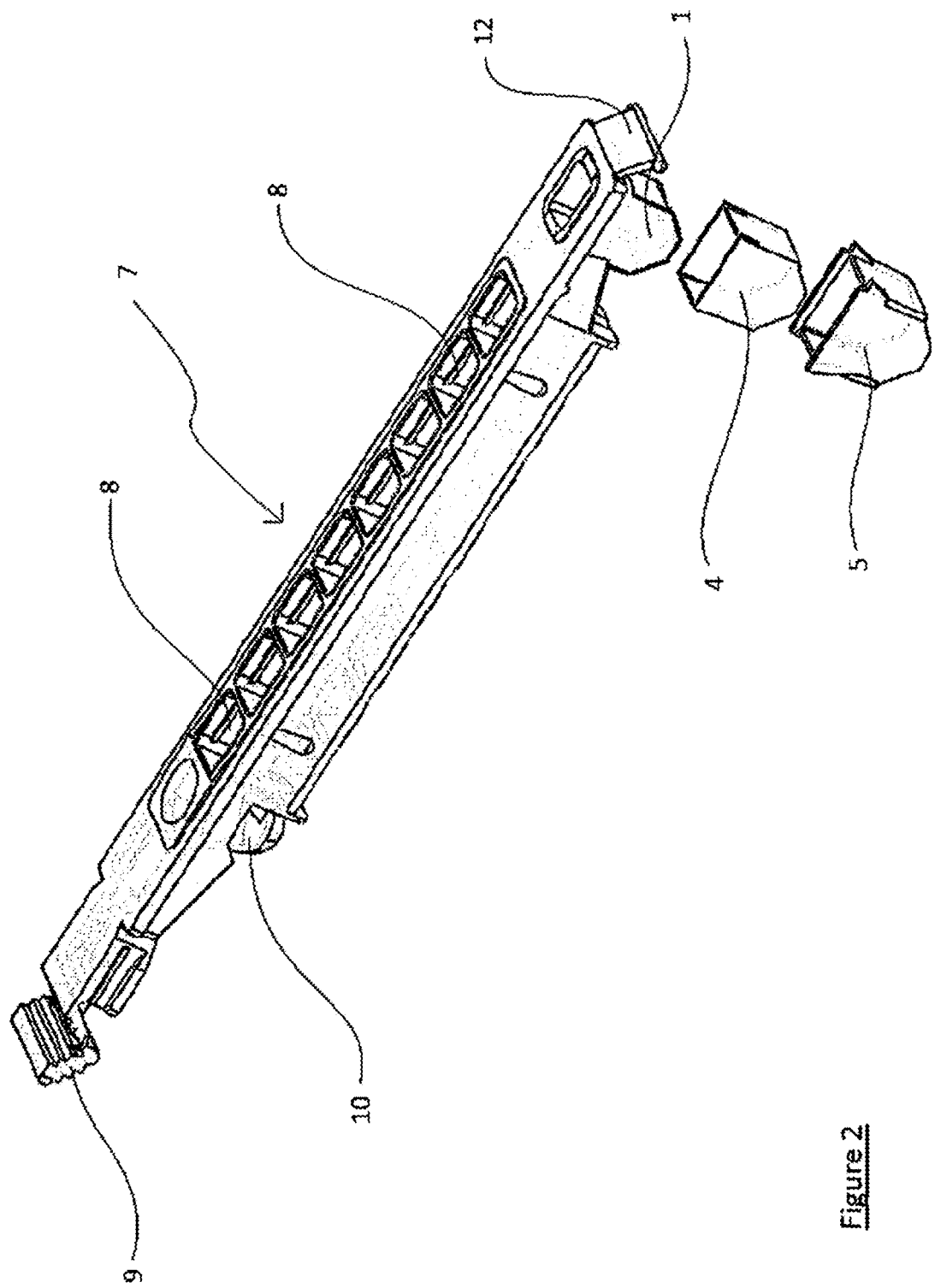
FIG. 2 represents a perspective view before the fitting of the clip on the retro-reflective paper and the reading cuvette of the bar.

FIGS. 1 and 2 show, according to the present invention, the way in which the quality of the fluorescent signals emitted is improved.

According to the embodiment of FIG. 1, the analysis cuvette 1 receives on the outside a sleeve 5, which itself receives on the outside a four-face inner coating 4.

According to the embodiment of FIG. 2, the analysis cuvette 1 receives on the outside a four-face inner coating 4, which itself receives on the outside a sleeve 5.

In the two situations, this four-face inner coating 4 is made of a retro-reflective material. It is obvious that, in order to serve its purpose, in the case of the embodiment of FIG. 1, the sleeve 5 must be made of a transparent or even translucent material which allows light to pass through said sleeve 5 so as to hit the coating 4.

Of course, it is also possible for the coating 4 and the sleeve 5 to be secured to one another so as to form just one part referred to as compound or complex sleeve 4 and 5.

The concept is therefore based on putting a complex "sock" or sleeve 4 and 5 in place on the substrate cuvette or analysis cuvette 1 of a bar 7, without modification of said bar 7.

This compound sleeve 4 and 5 provides particular retro-reflection optical properties. Some of the excitation photons pass through the analysis cuvette 1 without interacting with the fluorescent molecule resulting from the degradation of the substrate by the enzyme. The retro-reflection properties of the complex sleeve 4 and 5 make it possible to make these incident excitation photons leave again in the direction from which they came and therefore to pass once again through the analysis cuvette 1 and potentially react with a fluorescent molecule.

The emission photon is, for its part, not necessarily emitted in the axis of the detector. Consequently, an emission photon may also be retro-reflected when it reaches the sleeve 4 and 5 and may this time be captured by the sensor. Like all surfaces, the retro-reflective films are partially reflective. This property also provides the assembly with an additional gain. This is because, when an emission photon hits a face of the cuvette 1, fitted with the coating 4, at an angle a relative to the normal of the face in question, and when the angle of reflection $\beta$ ($\alpha=\beta$) superimposes on the axis of reading of the system, this photon is reflected to the axis of reading. Without this specific and supplementary reflection, these photons would not have been detected and the signal would have been less strong.

Various tests have been carried out to determine an optimal design, and the material with the best properties in the Vidas context. Numerous tests have also been directed toward finding a means of implementation without being detrimental to the optical properties.

Materials:

Various retro-reflective materials were supplied. These materials are arranged in two distinct types:

Bead-based retro-reflective substances (often glass beads) where the reflective part has a hemispherical shape 24, see FIG. 11, and Prism-based (plastic) retro-reflective substances where the bottom of the reflective part has a right-angle shape 23, see FIG. 12.

The retro-reflective materials that were tested were tested on a Vidas® immunology apparatus (bioMérieux—Marcy l'Etoile—France—reference: VIDAS® 30 Legacy, reference 410417) by means of the VIDAS TNI Ultra test (bioMérieux—Marcy l'Etoile—France—reference: 30448).

These materials are the following:

Retro-reflective material 231WW (Signs & Labels—Stockport—England, reference: 231WW or Radiospares—Beauvais—France, reference: 763-2042), Retro-reflective material Testo (Testo—Forbach—France, reference 0554 0493 or Radiospares—Beauvais, France, reference: 188-393), Retro-reflective material Mactac 4700 (MACtac France—Morangis—France, reference 4700), Retro-reflective material Mactac 5700 (MACtac France—Morangis—France, reference 5700), Retro-reflective material XUZB11 (Schneider-Electric—Rueil Malmaison—France, reference: XUZB11 or Radiospares—Beauvais—France, reference: 324-1620).

When sheets of these materials are taken with a photographic apparatus without flash and then with flash, notable differences between the retro-reflective films are already noted.

The best material when it is used with VIDAS® is Télémécanique which corresponds to the arrangement of micro-reflectors or of micro-tetrahedra. This tetrahedron corresponds to a cube cut by a plane passing through three diagonally opposed apices. This material exhibits a visual anisotropy, that is to say that it does not exhibit the same optical behavior (in this case reflection) depending on the direction of observation.

Mounting of the Retro-Reflective Material on the Cuvette 1:

Several options were evaluated from a biology viewpoint with a VIDAS® TNI Ultra test:

Adhesive bonding on the substrate cuvette with several types of double-sided adhesives:

TESA 4972 (TESA France—Lieusaint—France, reference: 4972),

TESA 4959 (TESA France—Lieusaint—France, reference: 4959),

Arcare 8570 (Adhesives Research Ireland Ltd—Limerick—Ireland, reference: 8570),

Mactac PT2113 (MACtac France—Morangis—France, reference PT2113).

Mechanical clip-fastening on the cuvette 1:

Bagclip (Interscience—Saint Nom—France, reference: 231 040),

Document binder (Office Dépôt—Dardilly—France, reference: 0017103).

It should be noted that, for the clips, they must remain compatible with the VIDAS® automated device, in particular in terms of size.

Biological Results:

Numerous tests were carried out in order to determine the impact of these sleeves 4+5 on a range of concentrations of cardiac troponin I (FIGS. 13 and 14), but also on the repeatability of the experiments (Table 1 and FIG. 15).

This range is composed of a serum matrix to which recombinant cardiac troponin I was added at various concentrations.

An increase in the concentration or dose of about 40% compared with the theoretical dose is observed in the presence of a sleeve 5, itself covered with a retro-reflective coating present on four faces. It should also be noted that the repeatability of these performance levels is very satisfactory, as is clearly demonstrated in Table 1 and Graph 3. The samples B and C are composed of a serum matrix overloaded with recombinant cardiac troponin I. The theoretical titer of B is 30 ng/l and of C is 55 ng/l.

TABLE 1

Study of repeatability of the samples B and C
assayed with the VIDAS ® TNI Ultra kit with or without the
presence of the sleeve according to the invention

| Sample | Without retro-reflective sleeve | | | With retro-reflective sleeve | | |
|---|---|---|---|---|---|---|
| | Amount observed (ng/l) | Average amount (ng/l) | CV (%) amount | Amount observed (ng/l) | Average amount (ng/l) | CV (%) amount |
| B | 40 | 33.33 | 15.49% | 70 | 68.33 | 5.97% |
|   | 30 |       |        | 70 |       |       |
|   | 30 |       |        | 70 |       |       |
|   | 40 |       |        | 70 |       |       |
|   | 30 |       |        | 70 |       |       |
|   | 30 |       |        | 60 |       |       |
| C | 50 | 50.00 | 0.00%  | 80 | 81.67 | 5.00% |
|   | 50 |       |        | 80 |       |       |
|   | 50 |       |        | 80 |       |       |
|   | 50 |       |        | 80 |       |       |
|   | 50 |       |        | 90 |       |       |
|   | 50 |       |        | 80 |       |       |

FIG. 3 shows an enlarged view of the end of the bar 7 seen from below at the level of the analysis cuvette 1. The presence, at the end of the bar 7, of a positioning lug 12 is noted, said lug facilitating the placing of said bar 7 in an automated device, not represented in the figures, which is suitable for carrying out the biological tests associated with the bar 7. In this figure, said cuvette 1 is bare, that is to say without any attached element. It is composed of four substantially vertical and flat walls and two bottom walls 3 which, together, partition the analysis cuvette 1. FIG. 4 shows an enlarged view of the end of the bar 7 seen from below at the level of the analysis cuvette 1. In this figure, which is identical to the previous one, said cuvette 1 is covered with the coating 4 and the sleeve 5. This cuvette 1 is still composed of four substantially vertical and flat walls, but which are covered with the complex sleeve 4 and 5, and of two bottom walls 3 which, together, partition the analysis cuvette 1 but are not covered by the sleeve 4 and 5. As a result, this creates a zone 6 which will in particular enable reading.

Figure 6:
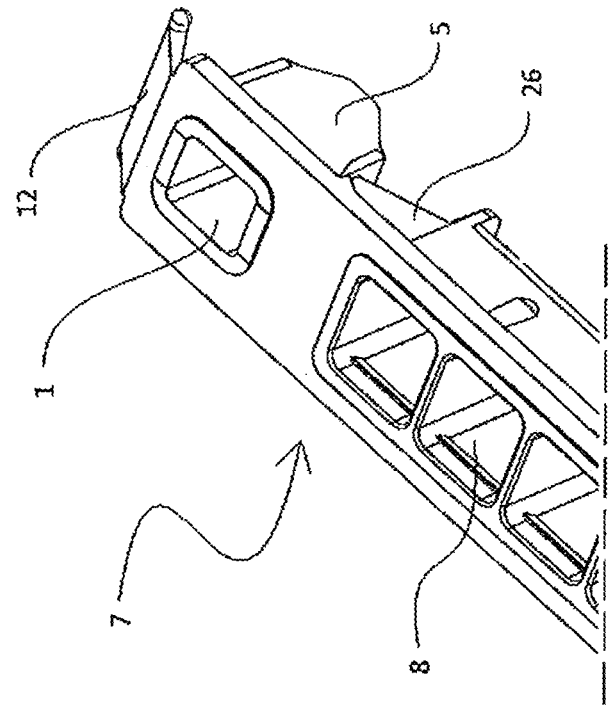
FIG. 6 represents a perspective view from above the reading cuvette after the retro-reflective paper and the clip have been put in place.
Figure 5:
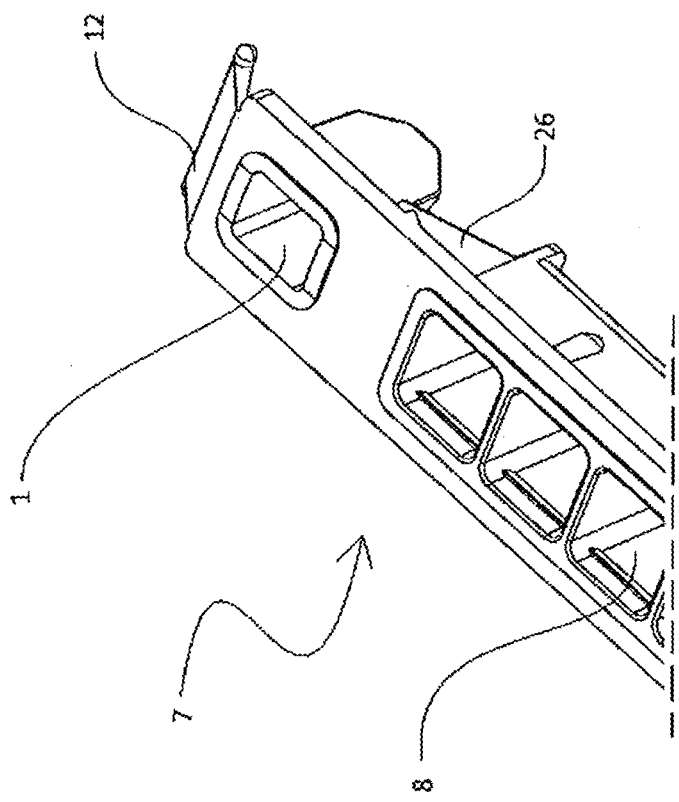
FIG. 5 represents a perspective view from above the reading cuvette before the retro-reflective paper and the clip have been put in place.

FIG. 5 shows an enlarged view of the end of the bar 7 seen from above at the level of the analysis cuvette 1. The positioning lug 12 is still present at the end of the bar 7. In this figure, said cuvette 1 is bare, that is to say with no attached element. FIG. 6 shows an enlarged view of the end of the bar 7 seen from above at the level of the analysis cuvette 1. In this figure, which is identical to the previous one, said cuvette 1 is covered with the sleeve 5, the coating 4 not being visible in this figure since it is sandwiched between the cuvette 1 and said sleeve 5.

FIG. 7 represents a sheet of retro-reflective paper 14 according to the invention in another embodiment, not represented previously. Thus, this retro-reflective coating 14 consists of a sheet comprising three faces: a central face 15 and two lateral faces 16.

Also noted is the presence of notches 13 for positioning the three-face coating 14 which facilitates the folding thereof for forming it and then putting it in place as close as possible to the analysis cuvette 1, which itself consists of small ribs 25 and large ribs 26 that are clearly visible in FIGS. 3 to 6.

FIG. 8 represents a sheet of retro-reflective paper 4 according to the invention according to a four-face embodiment but after forming thereof.

These four faces consist of two central faces 18 and two lateral faces 19 of the coating 4. Also noted is the presence of notches 17 for positioning the four-face coating 4. These notches may be small in size 17a or large in size 17b. Like the notches 13 previously seen, they facilitate the folding of the coating 4 for forming it and then putting it in place as close as possible to the analysis cuvette 1, which itself consists of small ribs 25 and large ribs 26 that are clearly visible in FIGS. 3 to 6.

The ribs 25 and 26 of the bar 7 and the notches 13, 17a and 17b of the coatings 14 and 4 cooperate together for correct positioning with respect to one another.

FIG. 9 represents a perspective view of one embodiment of the sleeve 5 before the sheet of retro-reflective paper 4 has been put in place therein. The sleeve 5, like the retro-reflective coating 4, consists of two central walls 27 and two lateral walls 28. A shoulder 29, the function of which will be subsequently explained below, is also present in the upper part of the two lateral walls 28.

FIG. 10 represents a perspective view of one embodiment of the sleeve or clip 5 according to FIG. 9 after the sheet of retro-reflective paper has been put in place therein according to FIG. 4. This configuration gives a better understanding of the role of the shoulders 29 which make it possible to hold the coating 4 in position without the use of glue, adhesive or the like. Of course, there could be just one shoulder. Alternatively, there could be just one shoulder on at least one of the central walls 27 or else one shoulder on each of the walls 27 and 28.

In the case of a retro-reflective coating 4 secured to the sleeve 5, the latter will therefore be able to do without the presence of a shoulder.

This invention is relevant in all optical systems, for increasing an optical signal and consequently a physical measurement. It is a passive means of increasing the signal while avoiding the loss of photons in the system. All measuring systems in which a beam of incident light passes through a medium to be characterized and in which, in return, a modification of the incident light by the medium passed through is measured may find this invention advantageous.

Fluorescence, diffusion, turbidity, etc., techniques may benefit from this invention. It should be noted that this invention is particularly advantageous when the light beams are not coherent light, for instance lasers. This system also makes it possible to decrease the size of the measuring cells since the light passes through twice and at the same place without imposing any great positioning and alignment constraint. This could therefore be advantageous for a microfluidic circuit with an excitation light-emitting diode by simplification and amplification of the response signal.

This system is particularly well suited when the sample has a very small volume and/or when the measuring cell has a very small volume.

REFERENCES

1. Analysis cuvette
2. Vertical wall partitioning the cuvette 1
3. Bottom partitioning the cuvette 1
4. Four-face inner coating
5. Sleeve
6. Zone of the cuvette 1 not covered by the sleeve 4
7. Analysis bar
8. Plurality of cuvettes also called compartments
9. Support
10. First cuvette 11. Detection tip
12. Positioning lug
13. Notches for positioning the coating 14
14. Three-face inner coating
15. Central face of the coating 14
16. Two lateral faces of the coating 14
17a. Small notches for positioning the coating 4
17b. Large notches for positioning the coating 4
18. Two central faces of the coating 4
19. Two lateral faces of the coating 4
20. Inner face of the sleeve 5
21. Small notches for positioning the sleeve 5
22. Large notches for positioning the sleeve 5
23. Bottom of the cuvette 1 of right-angle shape
24. Bottom of the cuvette of hemispherical shape
25. Small ribs of the analysis cuvette 1
26. Large ribs of the analysis cuvette 1
27. Two central walls of the sleeve 5
28. Two lateral walls of the sleeve 5
29. Shoulder of the sleeve 5
F1. Excitation beam
F2. Emission beam

The invention claimed is:

1. A cuvette in which a fluorescent enzymatic reaction can be carried out that is for analyzing a sample, the cuvette comprising at least one vertical wall and a bottom, wherein:
the cuvette is made of a transparent or translucent material;
the outside of the cuvette is partially covered with a sleeve that includes a retro-reflective coating comprising a retro-reflective material;
the retro-reflective coating is thereby on the outside of the cuvette so as to partially cover the outside of the cuvette; and
the sleeve is totally or partially present at the level of lateral partition(s) of the cuvette and is absent at the bottom of the cuvette.

2. The cuvette as claimed in claim 1, wherein the interior shape of the sleeve partially matches the exterior shape of the cuvette, with the exception of at least one zone configured to allow illumination at an excitation wavelength and detection of an emission wavelength from outside of the cuvette.

3. The cuvette as claimed in claim 1, wherein the retro-reflective material is either prism-based or bead-based.

4. The cuvette as claimed in claim 1, wherein the sleeve is attached to the cuvette by adhesive-bonding without deterioration of the optical qualities of the interior face of the sleeve.

5. The cuvette as claimed in claim 4, wherein the adhesive is transparent or translucent and does not absorb UV rays.

6. The cuvette as claimed in claim 1, wherein the sleeve is attached to the cuvette by mechanical clip-fastening.

7. The cuvette as claimed in claim 1, wherein the retro-reflective coating is sandwiched between the cuvette and the sleeve.

8. An analysis bar for analyzing a sample, the analysis bar comprising a plurality of cuvettes that include a first cuvette and the cuvette as claimed in claim 1 as a second cuvette, wherein the plurality of cuvettes are configured to contain and store liquid and to be used in combination with a tip during analysis that is configured to suction liquid from the first cuvette and to expel liquid into the second cuvette.

9. The analysis bar as claimed in claim 8, wherein the plurality of cuvettes are positioned along a longitudinal axis and the first cuvette is configured to receive the sample and the second cuvette acts as a final cuvette configured to allow reading of a signal during analysis of the sample.

10. The analysis bar as claimed in claim 9, wherein the plurality of cuvettes includes additional cuvettes between the first cuvette and the final cuvette.

11. An analysis device comprising the analysis bar as claimed in claim 8 and a support that supports the analysis bar.

12. A method of analyzing a sample comprising measuring fluorescence of the sample in the cuvette as claimed in claim 1 during analysis of the sample, wherein the fluorescence is indicative of at least one analyte in the sample.

13. The method as claimed in claim 12, wherein an analysis bar comprises the cuvette among a plurality of cuvettes.

14. The method as claimed in claim 12, wherein the analysis of the sample comprises carrying out an immunoassay.

15. A method comprising:
carrying out an enzymatic reaction between a substrate and an enzyme in the cuvette as claimed in claim 1 that results in producing a degradation product that is a fluorescent molecule; and
subjecting the fluorescent molecule to illumination at an excitation wavelength that results in fluorescence at an emission wavelength, wherein the fluorescence is indicative of at least one analyte in a sample.

16. A cuvette in which a fluorescent enzymatic reaction can be carried out that is for analyzing a sample, the cuvette comprising at least one vertical wall and a bottom, wherein:
the cuvette is made of a transparent or translucent material;
the cuvette is partially covered on the outside with a sleeve including an inner coating made of retro-reflective material that is in contact with the cuvette;
the sleeve is attached to the cuvette by an adhesive; and
the adhesive is transparent or translucent and does not absorb UV rays.

17. A cuvette in which a fluorescent enzymatic reaction can be carried out that is for analyzing a sample, the cuvette comprising at least one vertical wall and a bottom, wherein:
the cuvette is made of a transparent or translucent material;
the outside of the cuvette is partially covered with a sleeve that includes a retro-reflective coating comprising a retro-reflective material;
the retro-reflective coating is thereby on the outside of the cuvette so as to partially cover the outside of the cuvette; and
the sleeve is attached to the cuvette by adhesive-bonding without deterioration of the optical qualities of the interior face of the sleeve.

18. The cuvette as claimed in claim 1, wherein the retro-reflective material is prism-based.

19. The cuvette as claimed in claim 1, wherein the retro-reflective material is bead-based.

20. The cuvette as claimed in claim 17, wherein the adhesive is transparent or translucent and does not absorb UV rays.

21. A cuvette in which a fluorescent enzymatic reaction can be carried out that is for analyzing a sample, the cuvette comprising at least one vertical wall and a bottom, wherein:
the cuvette is made of a transparent or translucent material;
the outside of the cuvette is partially covered with a sleeve that includes a retro-reflective coating comprising a retro-reflective material;

the retro-reflective coating is thereby on the outside of the cuvette so as to partially cover the outside of the cuvette; and the sleeve is attached to the cuvette by mechanical clip-fastening.

* * * * *